F. M. HARDESTY.
CLUTCH RELEASE FOR MOTOR VEHICLES.
APPLICATION FILED APR. 11, 1916.
1,191,074.  Patented July 11, 1916.
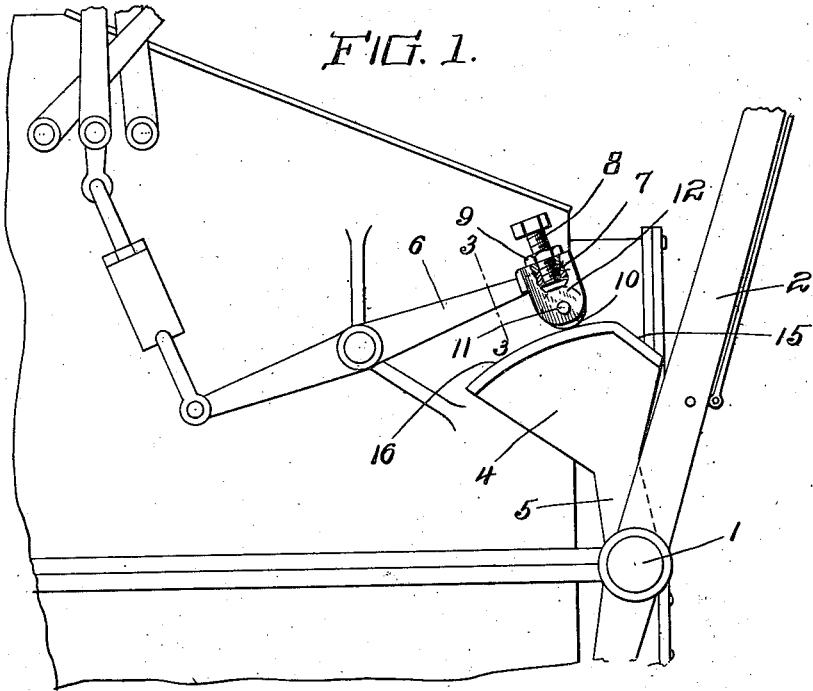
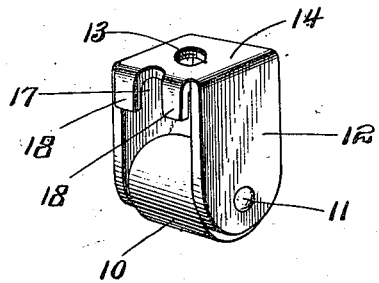
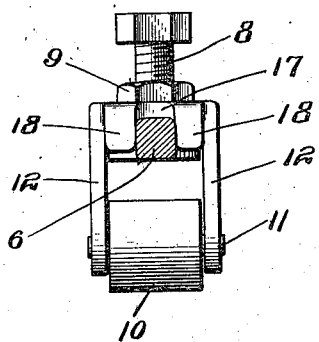
Inventor
F. M. Hardesty
By Victor J. Evans
Attorney
Witnesses
A. C. Newkirk

UNITED STATES PATENT OFFICE.

FRANK M. HARDESTY, OF CAMBRIDGE, OHIO, ASSIGNOR OF ONE-THIRD TO ELZA W. LAWYER AND ONE-THIRD TO CHARLES E. LOWRY, BOTH OF CAMBRIDGE, OHIO.

CLUTCH-RELEASE FOR MOTOR-VEHICLES.

1,191,074. Specification of Letters Patent. Patented July 11, 1916.

Application filed April 11, 1916. Serial No. 90,444.

*To all whom it may concern:*

Be it known that I, FRANK M. HARDESTY, a citizen of the United States, residing at Cambridge, in the county of Guernsey and State of Ohio, have invented new and useful Improvements in Clutch-Releases for Motor-Vehicles, of which the following is a specification.

This invention relates to clutch release mechanism for motor vehicles, the object in view being to greatly increase the life and durability of a certain feature of the clutch mechanism, doing away with the frequent adjustments necessary and also maintaining the clutch and brake mechanism as a whole at its maximum efficiency for a much greater period of time.

With the above and other objects in view, the invention consists in the novel construction, combination and arrangement of parts, as herein described, illustrated and claimed.

In the accompanying drawings: Figure 1 is a side elevation of a sufficient portion of the clutch and brake mechanism of an automobile to illustrate the application of the present invention thereto. Fig. 2 is a detail perspective view of the device of this invention. Fig. 3 is a section on the line 3—3 of Fig. 1.

Referring to the drawings 1 designates the usual rock shaft upon which the emergency brake lever 2 is fastened, said emergency brake lever being also utilized for the purpose of releasing the clutch which is then temporarily held in a neutral position by means of the usual pedal lever which controls the clutch.

4 represents the cam-shaped head of the usual arm 5 carried by the shaft 1 and bearing a fixed relation thereto.

6 represents what is known in the art as the clutch lever, the same being pivotally mounted between its ends, one arm thereof working in conjunction with the cam 4 and the other arm being connected with the clutch shifting mechanism.

The parts hereinabove referred to are of the ordinary construction and relative arrangement. In such ordinary construction, the rear end of the lever 6 is formed with a threaded hole 7 to receive an adjusting stop screw 8, the latter when adjusted being held by a lock nut 9 which bears directly against the end of the lever 6.

In carrying out the present invention. I employ the same adjusting screw 8 and lock nut 9 but in addition thereto I employ an anti-friction roller 10 which is journaled on a shaft 11 mounted in a fork or carrier 12 in the crown or top portion of which there is formed an internally threaded hole 13 to receive the screw 8. The roller 10 is located at such a distance from the crown or top 14 of the fork as to provide room enough for the adjacent end of the lever 6 so that the roller 10 will not touch said lever but merely ride upon either the lifting face 15 of the cam-shaped head 4 or upon the arcuate supporting face 16 thereof.

The fork or carrier 12 is placed over the end of the lever 6 as shown in Fig. 1 and the screw 8 is then inserted through the opening 13 and screwed into the opening 7 in the end of the lever. The jam nut 9 is then tightened thus preventing the screw 8 from working loose. Now the roller 10 coöperates with the working faces of the cam 4 instead of the end of the screw 8. This does away with the usual friction between the screw 8 and the cam 4 under the present day arrangement of said parts. When such set screw, under the ordinary arrangement, wears away at its lower end, the transmission controlling bands are permitted to drag or rub on the parts actuated by the freely running engine. This has the effect of wearing away the bands, making it necessary to renew them frequently and also causes a drag on the engine requiring the use of more fuel in starting and even while the machine is standing still with the engine running free. Very often when the machine is slowed down, such drag will cause a sudden stoppage of the engine to the great inconvenience of the operator. Furthermore, while the machine is standing still with the engine running, the car is subjected to continuous jerking and heavy vibrations which is, of course, undesirable and uncomfortable to the occupants of the vehicle. The improvement hereinabove described overcomes this serious objection and materially lengthens the life of the friction bands which control the transmission gearing and the brake and also the working faces of the cam 4. The device may be readily applied to any machine either at the time of manufacture or subsequent thereto.

The crown or top 14 of the carrier 12 is extended beyond the side arms of the work and deflected downwardly and formed with a central notch 17 to receive a portion of the lever 6 and to provide stop lips 18 which engage behind the enlarged or rounded rear extremity of the lever 6 to avoid any possibility of the carrier becoming detached or slipping off the end of the lever 6.

I claim:—

In a motor vehicle, the combination with the transmission clutch lever, and the cam with which said clutch lever coöperates, of an anti-friction roller, a carrier therefor in which said roller is journaled, said carrier being adapted to embrace said clutch lever, and means for fastening said carrier in place so that the roller will be held in contact with the working face of the cam, said carrier being provided with stop lips extending inwardly from the crown portion thereof and adapted to embrace the body of the clutch lever and bear against the enlarged end portion thereof.

In testimony whereof I affix my signature.

FRANK M. HARDESTY.

Witnesses:
D. B. Speer,
L. C. Temple.